April 28, 1959 H. C. LIEBMANN, JR 2,883,700

ANIMAL TRANSFER DEVICE

Filed July 13, 1954 12 Sheets-Sheet 1

Herbert C. Liebmann, Jr.
INVENTOR.

BY Clarence A. O'Brien
and Harvey B. Jacobson
Attorneys

April 28, 1959 H. C. LIEBMANN, JR 2,883,700

ANIMAL TRANSFER DEVICE

Filed July 13, 1954 12 Sheets-Sheet 2

Herbert C. Liebmann, Jr.
INVENTOR.

BY Clarence A. O'Brien
and Harvey B. Jacobson
Attorneys

Herbert C. Liebmann, Jr.
INVENTOR.
BY Clarence A. O'Brien and Harvey B. Jacobson
Attorneys April 28, 1959 H. C. LIEBMANN, JR 2,883,700

ANIMAL TRANSFER DEVICE

Filed July 13, 1954 12 Sheets-Sheet 4

Herbert C. Liebmann, Jr.
INVENTOR.

BY Clarence A. O'Brien
and Harvey B. Jacobson
Attorneys

Herbert C. Liebmann, Jr
INVENTOR.

BY Clarence A. O'Brien and Harvey B. Jacobson
Attorneys

April 28, 1959 H. C. LIEBMANN, JR 2,883,700

ANIMAL TRANSFER DEVICE

Filed July 13, 1954 12 Sheets-Sheet 6

Herbert C. Liebmann, Jr.
INVENTOR.

BY Clarence A. O'Brien and Harvey B. Jacobson
Attorneys

April 28, 1959 H. C. LIEBMANN, JR 2,883,700

ANIMAL TRANSFER DEVICE

Filed July 13, 1954 12 Sheets-Sheet 7

Herbert C. Liebmann, Jr.
INVENTOR.

BY Clarence A. O'Brien
and Harvey B. Jacobson
Attorneys

Herbert C. Liebmann, Jr.
INVENTOR.

BY Clarence A. O'Brien
and Harvey B. Jacobson
Attorneys

ANIMAL TRANSFER DEVICE

Filed July 13, 1954

Herbert C. Liebmann, Jr.
INVENTOR.

BY Clarence A. O'Brien and Harvey B. Jacobson, Attorneys

April 28, 1959 H. C. LIEBMANN, JR 2,883,700

ANIMAL TRANSFER DEVICE

Filed July 13, 1954 12 Sheets-Sheet 10

Herbert C. Liebmann, Jr.
INVENTOR.

BY Clarence A. O'Brien
and Harvey B. Jacobson
Attorneys

April 28, 1959 H. C. LIEBMANN, JR 2,883,700

ANIMAL TRANSFER DEVICE

Filed July 13, 1954 12 Sheets-Sheet 11

Herbert C. Liebmann, Jr.
INVENTOR.

BY Clarence A. O'Brien
and Harvey B. Jacobson
Attorneys

Herbert C. Liebmann, Jr.
INVENTOR.

BY Clarence A. O'Brien
and Harvey B. Jacobson
Attorneys

United States Patent Office 2,883,700

Patented Apr. 28, 1959

2,883,700

ANIMAL TRANSFER DEVICE

Herbert C. Liebmann, Jr., Green Bay, Wis., assignor to Liebmann Packing Company, a corporation of Wisconsin Application July 13, 1954, Serial No. 443,044

2 Claims. (Cl. 17—24)

This invention relates to new and useful improvements in the process and apparatus for slaughtering animals, and finds specific use in the slaughtering of beef cattle in a meat packing plant.

An object of this invention is to provide an improved process and apparatus wherein the entire slaughtering operation of an animal is carried out upon a moving overhead conveying system from the time an animal is killed until it has been completely processed.

A further object of the present invention is to provide a process and apparatus conformable to the preceding objects wherein the slaughtering process is carried out without lowering the animal to the floor or other supporting surface and wherein the apparatus is provided with improved sterilization means for continuously maintaining the slaughtering apparatus in a sterilized sanitary condition.

A still further object of the present invention is to provide a process and apparatus for slaughtering animals that provides improved operating methods that permit a more efficient and accurate slaughtering operation and simultaneously providing sterilization means for maintaining the apparatus in a sterilized condition during all stages of the process.

Another important feature of the present invention is to provide a process and apparatus for slaughtering animals wherein the handling of the carcasses is entirely carried out by mechanical means having partial automatic controls and safety means for assuring the smooth flow of the carcasses during the slaughtering operation.

Still another important object of the present invention is to provide a process and apparatus as set forth in the preceding objects wherein the animals are slaughtered and dressed in a continuous operation due to the provision of a moving overhead conveying means and also permits accurate spacing and timing of the movement of the carcasses, thereby considerably increasing the efficiency of the slaughtering operation and yet permitting a high degree of quality to be obtained from the carcasses with a minimum damage thereto for increasing the sale value of the final products.

Yet another feature of the present invention is to provide a process and apparatus as set forth hereinbefore wherein the entire process and apparatus may be carried out and manipulated by relatively unskilled labor normally required for several stages of the dressing of the carcasses.

A still further, relatively important object of the present invention is to provide a process and apparatus for slaughtering animals wherein the apparatus may be adapted to various planned layouts for various types of animals for performing the slaughtering and dressing operation in a most efficient manner.

Yet a further object of the present invention is to provide a process and apparatus as set forth hereinbefore wherein the apparatus that contacts the carcasses is sterilized after each contact with the carcasses, thereby retaining the apparatus in a sanitary condition for preventing the accumulation of bacteria or other germs on the dressed carcasses.

Other important objects of the present invention are found in its relatively simple construction and operation, versatility, flexibility, efficiency in operation, ease of operation by unskilled workers, cleanliness and sterilization, safety features, semi-automatic operation, adaptability for its intended purposes, and relatively inexpensive manufacture and maintenance.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

*The process of slaughtering animals*

It is general knowledge that present-day packing houses are utilized for completely dressing animals such as beef cattle from the time they are stunned or killed until they are ready for storage or other final disposition. Since the number of animals being slaughtered and dressed in present-day packing houses is relatively greater than in the previous type packing houses, the methods utilized previously are now outmoded.

Former methods of slaughtering and processing animals has included the use of pritch plates for supporting a carcass while the hide is being removed by several operators working in a stooped position. This type of process is extremely difficult and requires considerable labor on the part of the operators for maneuvering the carcass as desired.

Figure 1:
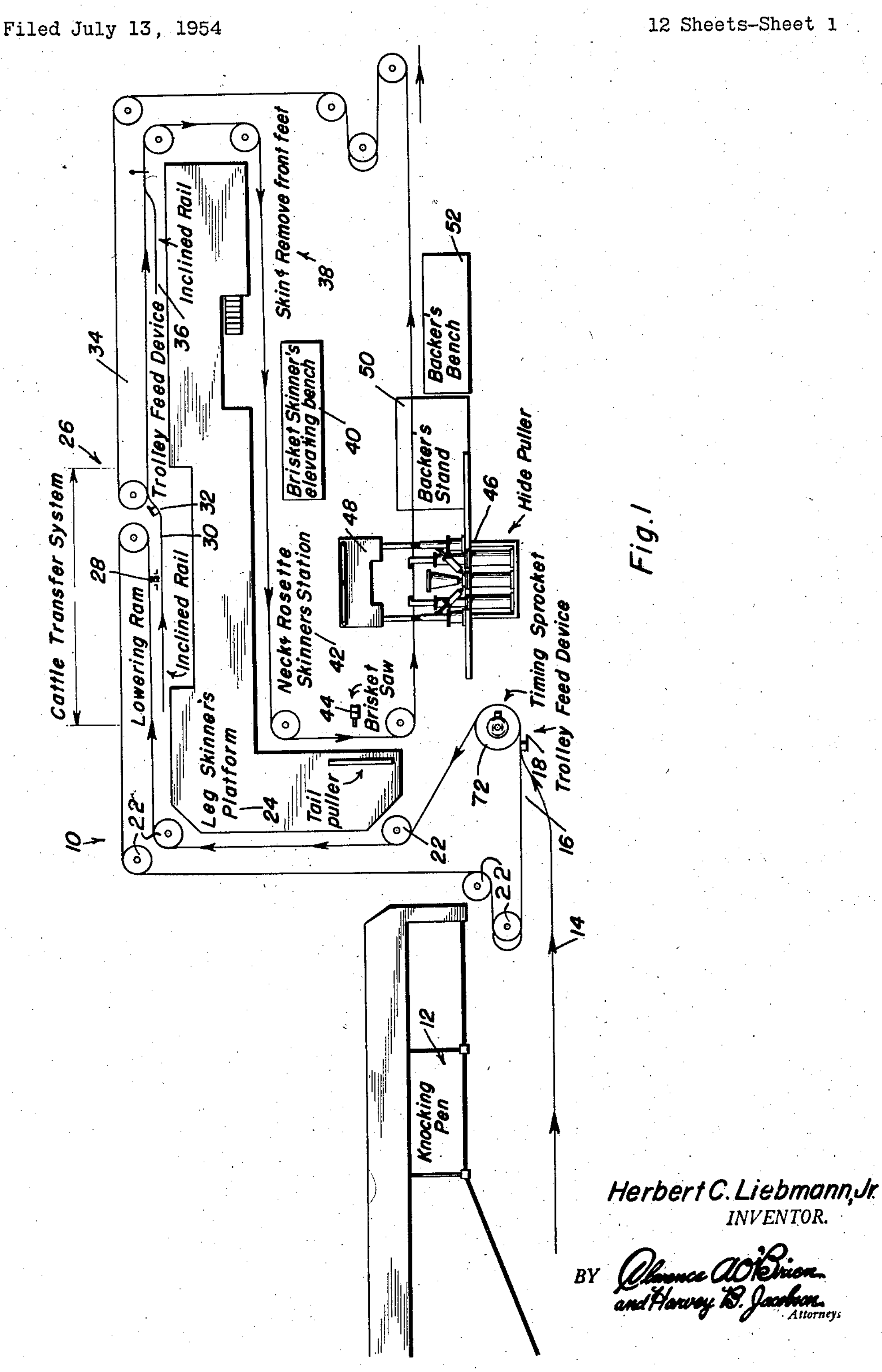
Figure 1 is a schematic plan view showing the process for slaughtering animals of the present invention.

Referring now specifically to Figure 1 of the accompanying drawings, the process hereinafter to be described is set forth in schematic form wherein the carcass is elevated onto an overhead conveying system wherein the entire processing or dressing operation is carried out with a minimum of exertion on the part of the various persons performing the various operations and wherein a minimum of floor space is utilized. While the disclosed process includes the general arrangement, it will be understood that various operations may be carried out at any point along the conveying system wherein the various working platforms may be positioned as desired.

Referring now specifically to Figure 1, it will be seen that the numeral 10 generally designates the diagrammatical layout of the process for slaughtering animals of the present invention. The animal is first stunned in the knocking pen 12 and one rear leg thereof is shackled to a suitable chain and raised to a rail 14 wherein it is fed onto a continuous rail 16 by a trolley feed device 18. The shackle rides on an endless rail moved by an endless chain wherein the chain is provided with a timing sprocket 72 and idler sprockets 22. As the carcasses proceed along the endless rail 16, they pass the leg-skinning platform 24 wherein one rear leg of a carcass is skinned and dressed. The carcass then enters a cattle transfer system, as generally indicated by the numeral 26, and including a lowering ram 28 and an inclined rail 30. As the shackle enters the lowering ram, the dressed leg is engaged with a hook shackle positioned on the inclined rail, and the lowering ram lowers the carcass so that the dressed leg supports the weight thereof and the chain shackle is removed. The carcass on the hook shackle then proceeds downwardly on the inclined rail to a trolley feeding device 32 wherein the hook shackle then engages a second endless rail 34 having the carcasses moved therealong by an endless conveying chain. The second rear leg of the animal is then dressed and is engaged with a hook shackle over a second inclined rail 36 wherein the weight of the carcass is then supported by two hook shackles mounted on the endless rail 34. The carcasses then proceed along the endless rail 34 past the station for skinning and removing the front feet, the station for skinning the brisket which may be an elevating bench and then to the neck and rosette skinner station. The carcasses are operated on in the stations in the usual manner, and it will be seen that the front feet skinning and removing station is indicated by the numeral 38, the brisket skinning elevating bench is indicated by the numeral 40, and the neck and rosette skinner station is indicated by the numeral 42. The carcasses then proceed past the brisket saw 44 wherein the brisket is opened in the usual manner. After passing the brisket saw 44, the carcasses are positioned in front of a hide puller 46 having an operator's platform 48 positioned oppositely therefrom wherein the carcasses will be automatically positioned centrally of the hide puller 46 and the hide puller 46 is provided with remote controls adjacent the operator's platform and the hide-engaging portions are provided with sterilizing means for retaining the hide puller 46 in a sterile or sanitary condition. The carcasses then proceed past the backer stand 50 and backer's bench 52 wherein the animal carcasses are completely skinned and ready for further processing.

It will be seen that the complete slaughtering of the animals has been carried out without removing the carcasses from the overhead rail upon which they were initially placed after the stunning operation. Further, the operation is carried out in a most efficient manner using a small number of employees for carrying out the operation. The various apparatuses for carrying out the preceding method will be subsequently described.

*The apparatus for slaughtering animals*

Referring now specifically to the remainder of the drawings, it will be seen that preferred apparatuses are shown for carrying out an improved process for slaughtering and processing animals in a continuous and efficient manner as set forth in the preceding description of the process.

Figures 2, 12:
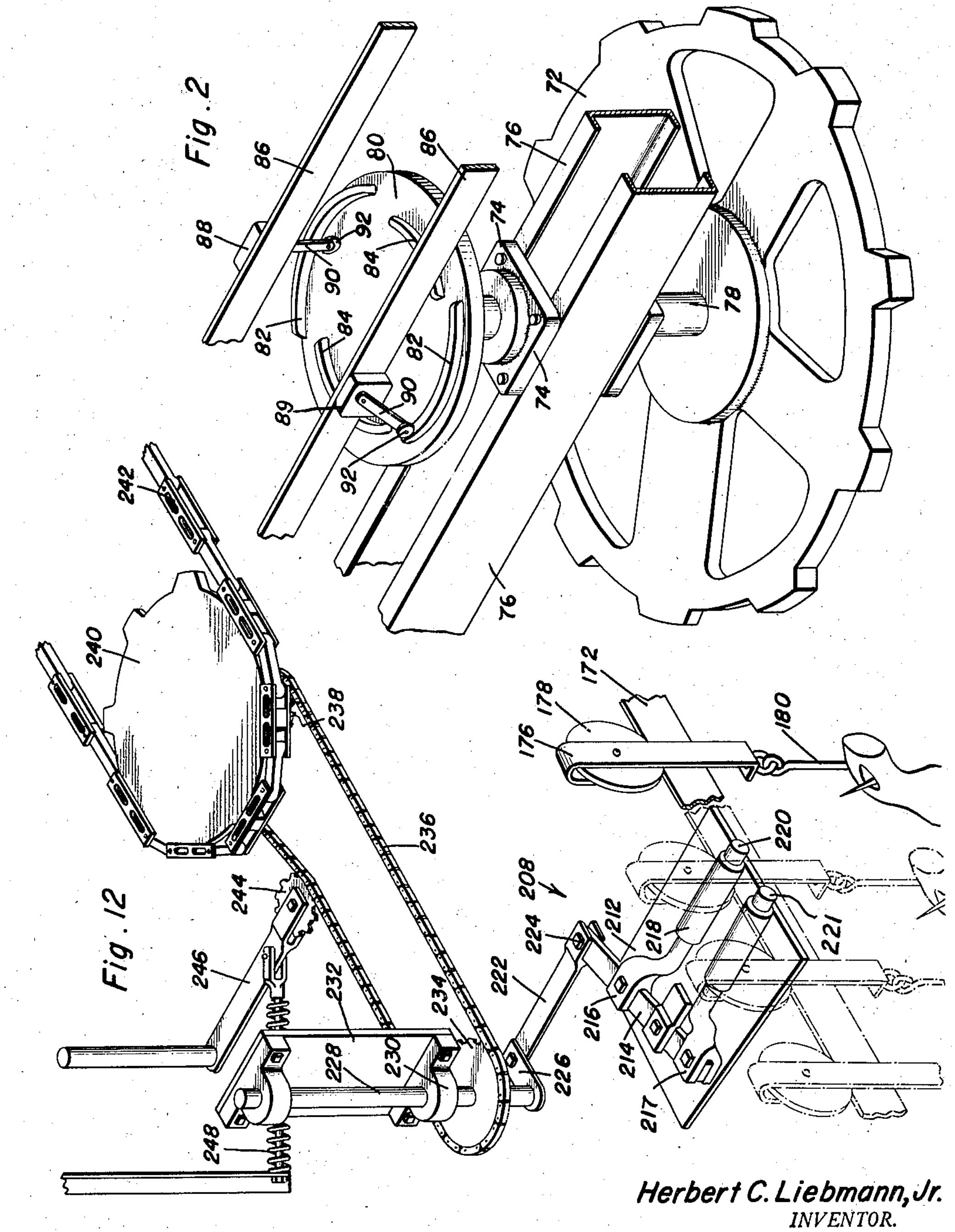
Figure 2 is a detailed perspective view showing the timing sprocket for the endless chain for conveying the carcasses along the overhead rails at predetermined intervals.
Figure 12 is a perspective view showing the automatic means for permitting discharge of a single hook shackle wherein the automatic means is operated from the conveying chain sprockets.
Figures 3, 19:
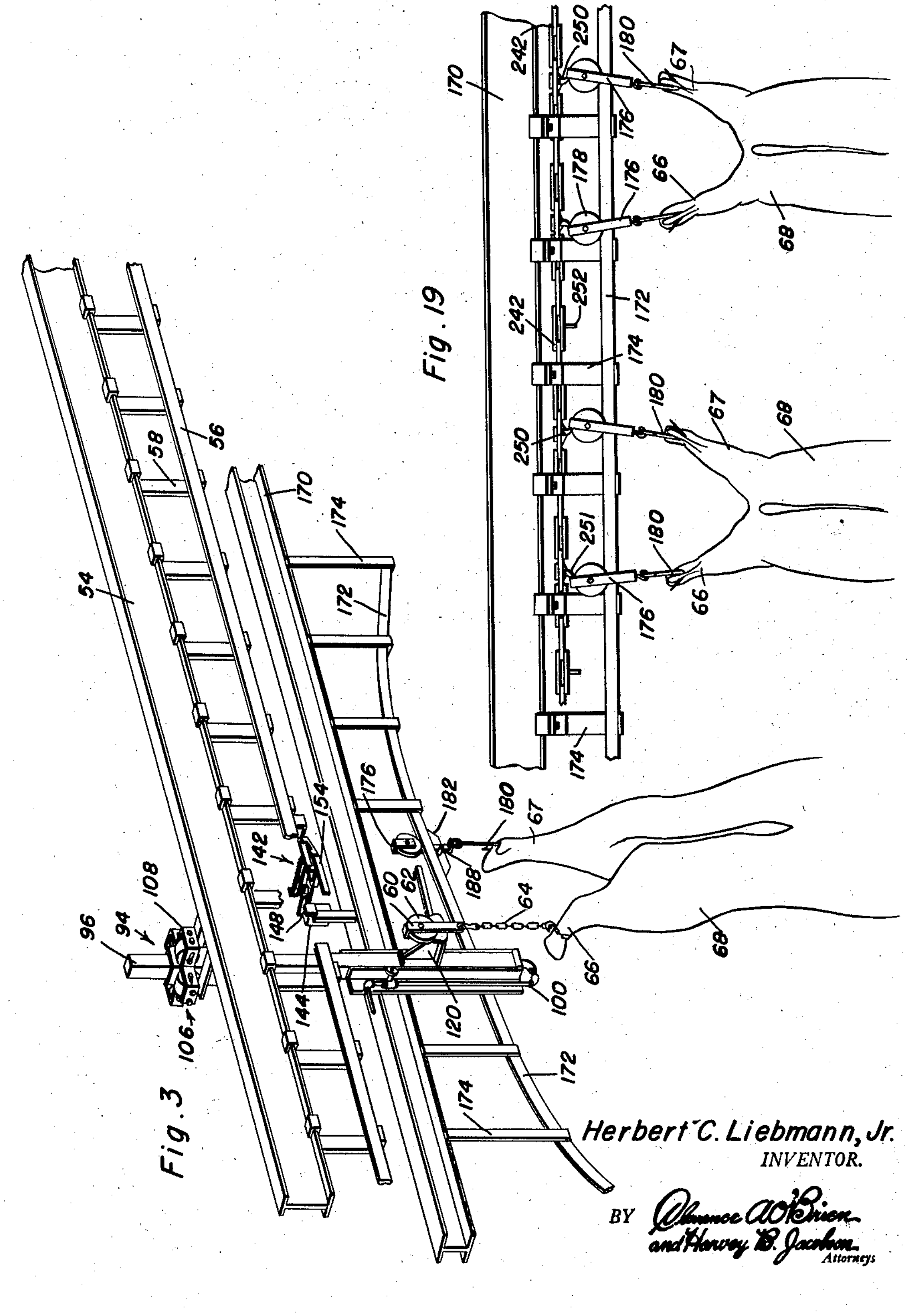
Figure 3 is a perspective view showing the lowering ram and the safety switch for transferring the carcass from one rail to another wherein the carcass is supported temporarily from a single hook and the chain around the undressed leg is removed.
Figure 19 is a side elevational view showing the endless chain conveying means with the engaging members thereon engaging the hook shackles for retaining the legs of the carcass in spread position.
Figure 4:
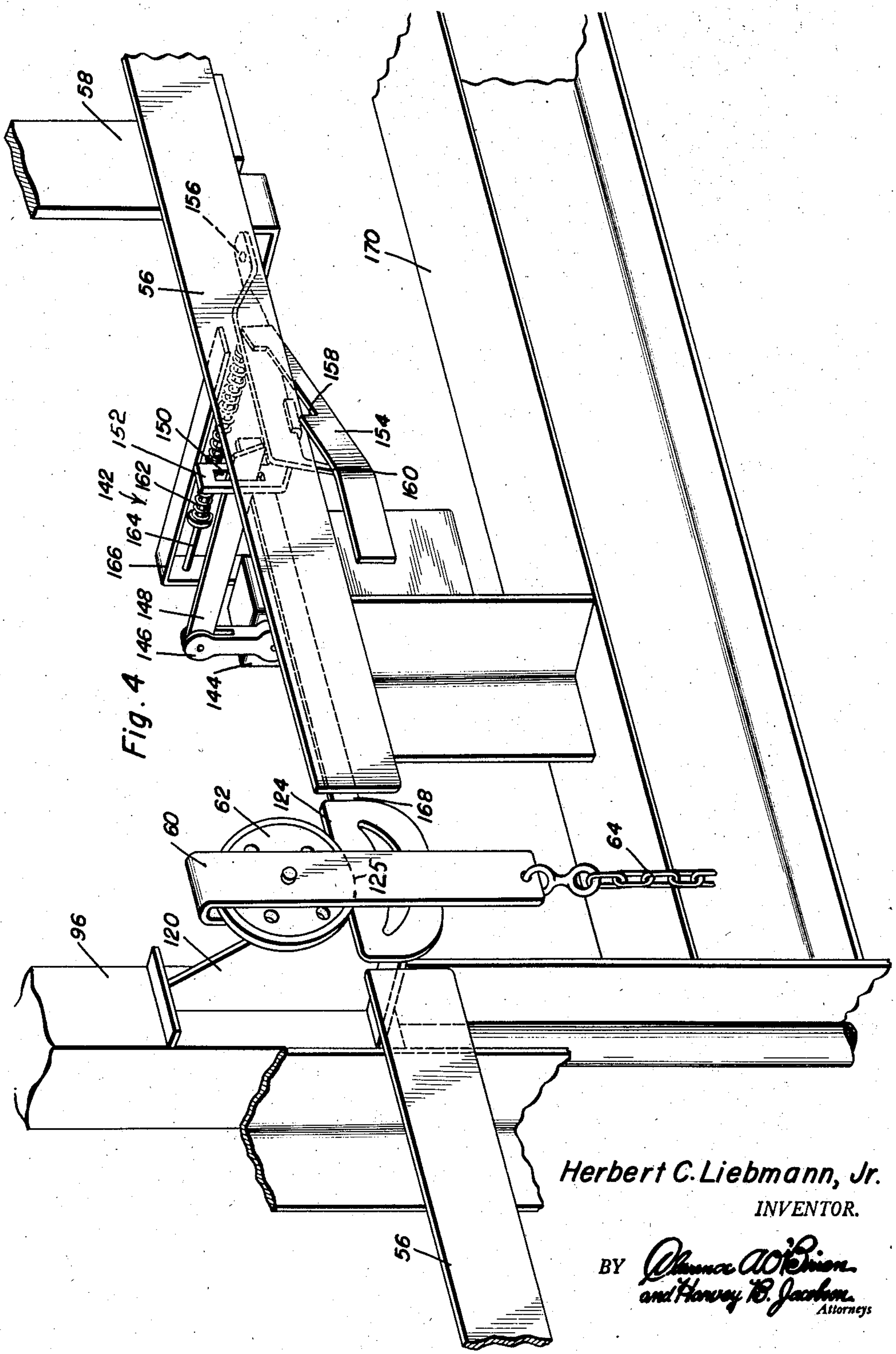
Figure 4 is an enlarged perspective view showing the details of construction of the lowering ram and the safety switch for assuring that the lowering ram is in proper position during movement of the carcasses.

Referring now specifically to Figure 3, it will be seen that an overhead rail 54 is provided with an overhead trackway 56 that is suspended therefrom by suitable brackets 58 wherein the trackway 56 is continuous for movement of shackles 60 having rollers 62 thereon and chains 64 depending therefrom for engaging one rear leg 66 of a carcass 68 with the other leg 67 hanging free. The shackles 60 are urged along the trackway 56 by a conveying chains 70 passing over a timing sprocket 72 at one end and an idler sprocket at the other end with other suitable idler sprockets 22 placed as desired (see Figures 1, 2 and 10). The timing sprocket 72 is rotatably journaled in bearings 74 mounted on a pair of rails 76. The rotating shaft 78 extends upwardly and is provided with a circular plate 80 above the upper surface of the rails 76 wherein the rotating plate 80 is provided with two pairs of arcuate cams 82 and 84. A pair of bracket rails 86 are mounted over the plate 80 and the rails 86 are provided with switches 88 and 89 with each switch having a depending arm 90 thereon with a roller 92 at its lower end. One of the rollers 92 is positioned for engagement by the arcuate cams 82 while the other of the rollers 92 is positioned for engagement by the cams 84, thereby actuating the switches 88 and 89 as the timing sprocket 72 rotates.

Positioned adjacent the end of the trackway 56 wherein the trackway curves around to make a return is a lowering ram, generally indicated by the numeral 94. The lowering ram includes a movable polygonal cylinder 96 that is generally elongated and slidable over a stationary piston 98 wherein the piston 98 is connected to a hydraulic system by suitable conduits 100. The piston 98 is provided with a seal 102 at its outer end and the conduit 100 is connected to the inner portion of the piston 98 wherein the piston head is provided with an aperture 104 in communication with the cylinder 96 wherein fluid pressure admitted into the piston 98 and into the cylinder 96 through the aperture 104 will urge the cylinder 96 upwardly. Mounted alongside the rail 54 is a pair of guide means, generally designated by the numeral 106, for guiding the vertical movement of the cylinder 96. Each of the guide means 106 includes four extending rectangular housings 108 that are provided with open inner ends wherein each of the housings 108 is provided with a slot 110 in each side wall thereof for slidably receiving an axle bolt 112 for journaling a roller 114 therein, with the rollers 114 engaging the outer surface of the movable cylinder 96, thereby guiding the vertical movement thereof. The bolts 112 are provided with surrounding collars 116 having a bolt 118 extending therefrom adjacent each end of the axle 112, thereby providing an adjusting means for the roller 114. The bolts 118 extend outwardly of the outer surface of the housings 108 wherein the position of the rollers 114 may be adjusted by manipulating the bolts 118. It will be seen that the rollers 114 closely engage each side of the reciprocating cylinder 96, thereby guiding the vertical movement of the cylinder 96 in a manner that appears obvious from the drawings. Secured to the lower portion of the slidable cylinder 96 is a projecting bracket 120 having a vertical plate 124 thereon having an arcuate recess 125 in the upper edge thereof wherein the plate 124 is normally disposed as a continuation of the trackway 56. When fluid pressure is exhausted from the cylinder 96, the plate 124 together with the shackle 60 positioned thereon will be lowered, thereby lowering the carcass 68.

Figure 13:
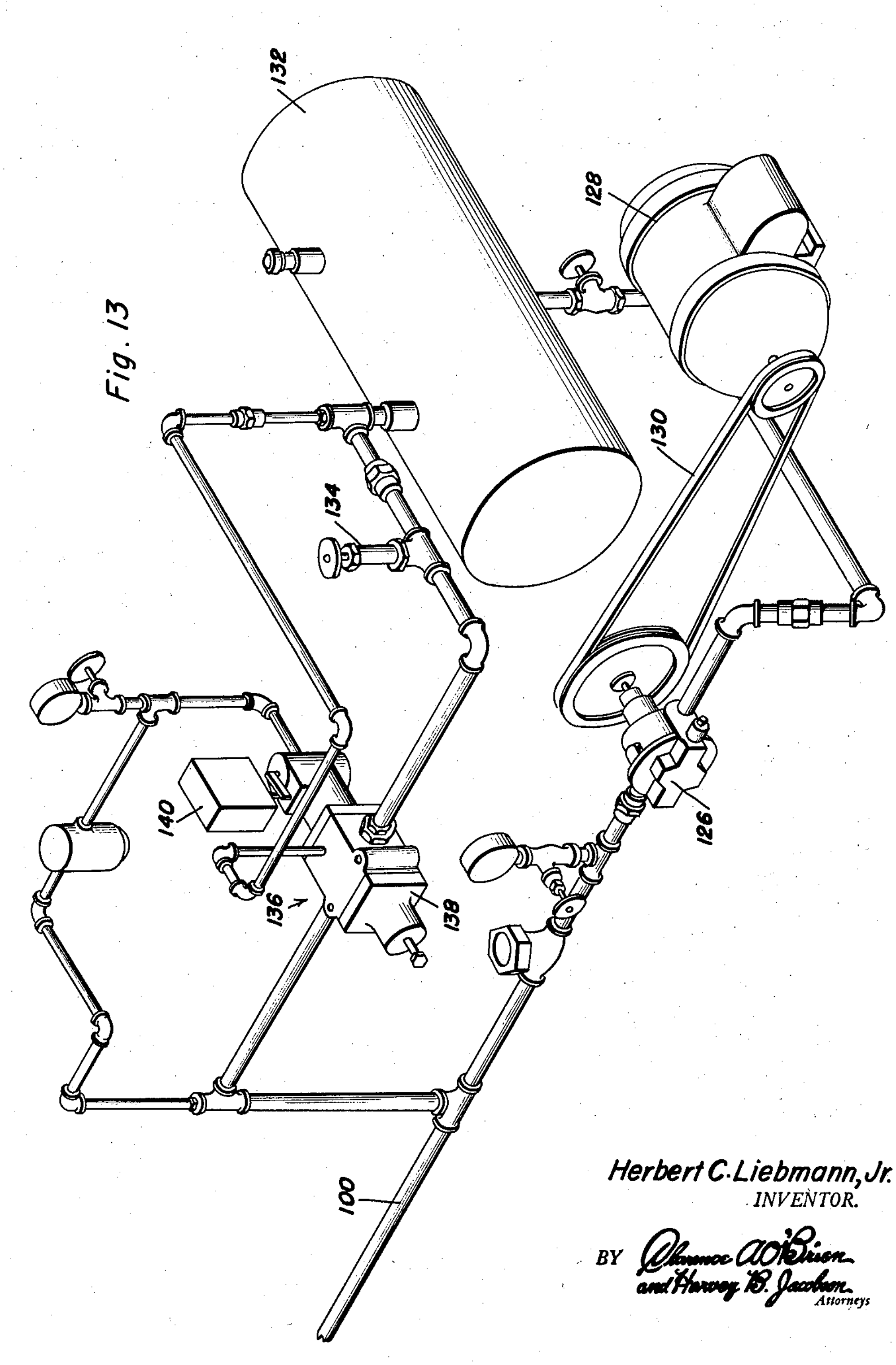
Figure 13 is a schematic, perspective view showing the hydraulic stop and control mechanism therefor for controlling the operation of the lowering ram.

Referring now specifically to Figure 13 of the drawings, it will be seen that the fluid conduits 100 are connected to a fluid pump 126 driven by a suitable electric motor 128 and a V-belt drive 130. A supply tank 132 is provided, together with suitable control valves 134 and a solenoid-operated control device generally indicated by the numeral 136 which includes a valve 138 provided with a solenoid switch 140 for controlling the fluid pressure in the conduit 100. The switch 88 for engaging the inner cams 84 actuates the solenoid for relieving or reducing the pressure in the conduit 100 wherein the pressure is exhausted or discharged into the tank 132, thereby permitting the lowering ram 94 to lower to its lowermost position. As the timing sprocket 72 continues to rotate, the switch 89 having the roller 92 for engaging the outer cams 82 will be actuated wherein the pump 126 will be actuated, thereby pumping pressure through the conduit 100 into the cylinder 96, thereby raising the cylinder 96 together with the plate 124, thereby closing the trackway 56 wherein the roller 62 of the shackle 60 may pass thereover.

In order to prevent the shackles 60 from being positioned over the open portion of the rail 56 when the lowering ram 94 is in its lowered position, a safety switch, generally designated by the numeral 142, is provided for stopping the conveyor if the lowering ram is not in its uppermost position with the plate 124 forming a continuation of the trackway 56. The safety switch 142 includes a switch 144 having an operating arm 146 attached thereto with a lever 148 extending therefrom. The lever 148 extends through a slot 150 in a vertical arm of a bracket 152 wherein the end of the lever 148 may be raised and lowered within the limits of the slot 150. An actuating arm 154 is pivotally connected to a supporting bracket by a pivot pin 156 and the arm 154 is provided with a slot or recessed portion 158 on the upper edge thereof for receiving the lower edge of the track 56. The arm 154 is also provided with an angular offset portion 160 that extends under the trackway 56 for engaging the inner end of the lever 148. The arm 154 extends into the path of movement of the shackles 60 wherein the arm is provided with a camming surface for engagement by the shackles 60 wherein the arm 154 will be urged toward the trackway 56. A compression coil spring 162 is mounted on a rod 164 secured to a suitable bracket 166 wherein the compression spring 162 extends between the angulated portion 160 of the arm 154 for continuously urging the arm 154 outwardly of the forward surface of the trackway 56, thereby engaging the arm 154 with the shackles 60 as the shackles 60 move along the trackway 56. An elongated arm 168 extends from the plate 124 alongside the rear surface of the trackway 56 wherein the outer end of the arm 168 is positioned under the end of the lever 148 remote from the switch 144 wherein the arm 168 will raise and lower the lever 148 within the limits of the slot 150. When the lowering ram 94 is in its uppermost position, the arm 168 has engaged the lever 148 and lifted it to the upper end of the slot 150 wherein the arm 154 will pivot about pivot pin 156 upon engagement by the shackles 60 wherein the angulated portion will pass under the outer end of the lever 148, thereby permitting the conveyor chain 70 to continue without actuating the switch 144. However, in the event that the plate 124 is not in alignment with the trackway 56 due to the lowering ram 94 being at its lowermost position, the arm 168 is out of engagement with the lever 148 wherein the lever 148 is at the lower end of the slot 150. In this position, the angulated portion 160 of the arm 154 will engage the end of the lever 148 when a shackle 60 engages the arm 154, thereby actuating the switch 144. The switch 144 will immediately stop the conveying chain 70, thereby stopping the shackles 60 from passing onto the open portion of the trackway 56 and becoming disengaged therefrom.

Figures 5, 6, 7:
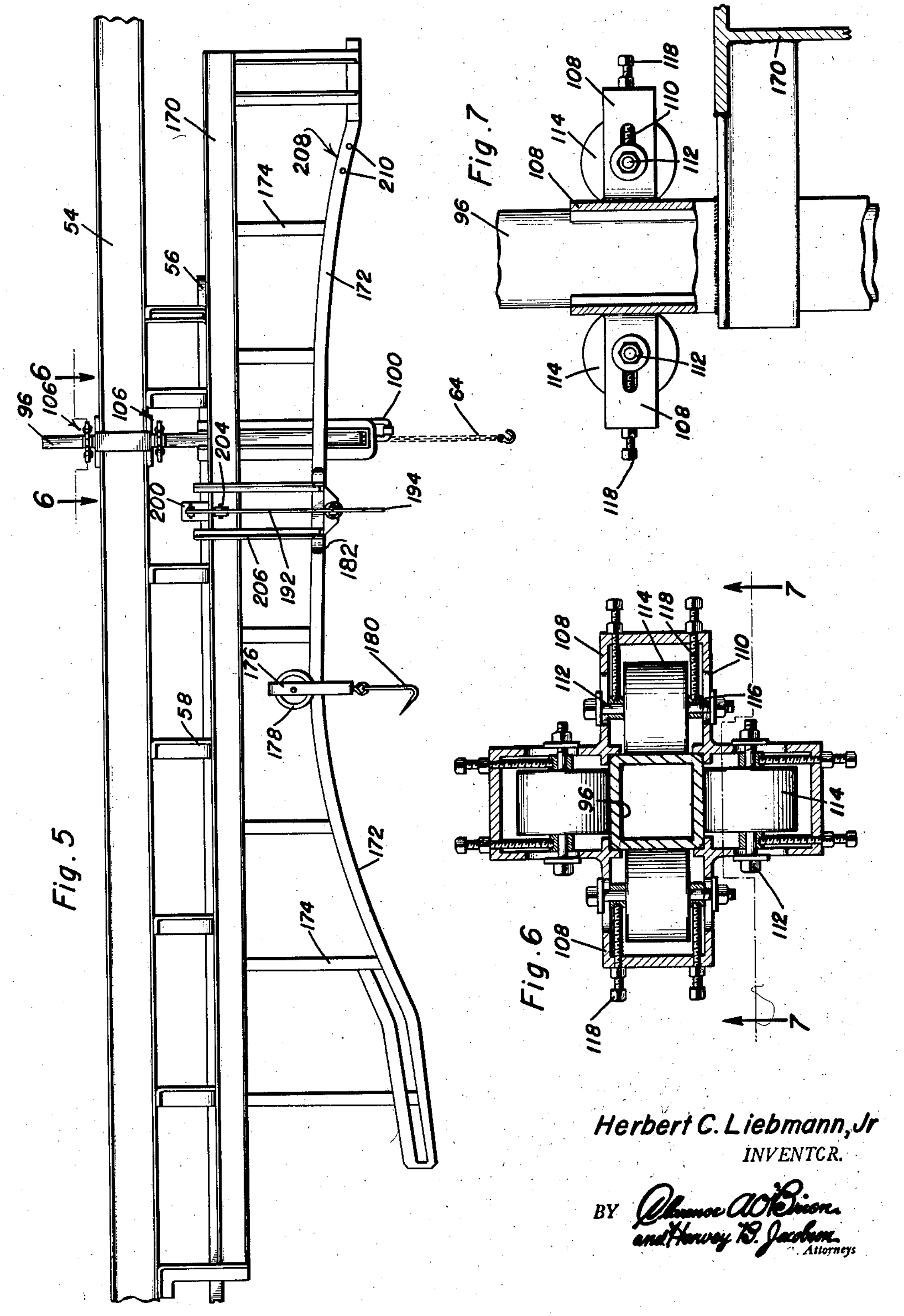
Figure 5 is a side elevational view showing the construction of the lowering ram, the inclined rail and the control means for limiting movement of the carcasses.
Figure 6 is an enlarged top plan sectional view taken substantially along section line 6—6 of Figure 5 showing the details of construction of the lowering ram and the guide rollers therefor.
Figure 7 is a detailed sectional view taken substantially upon a plane passing along section line 7—7 of Figure 6 showing further structural details and relationship of the lowering ram and the guide rollers therefor.
Figures 9, 10, 11:
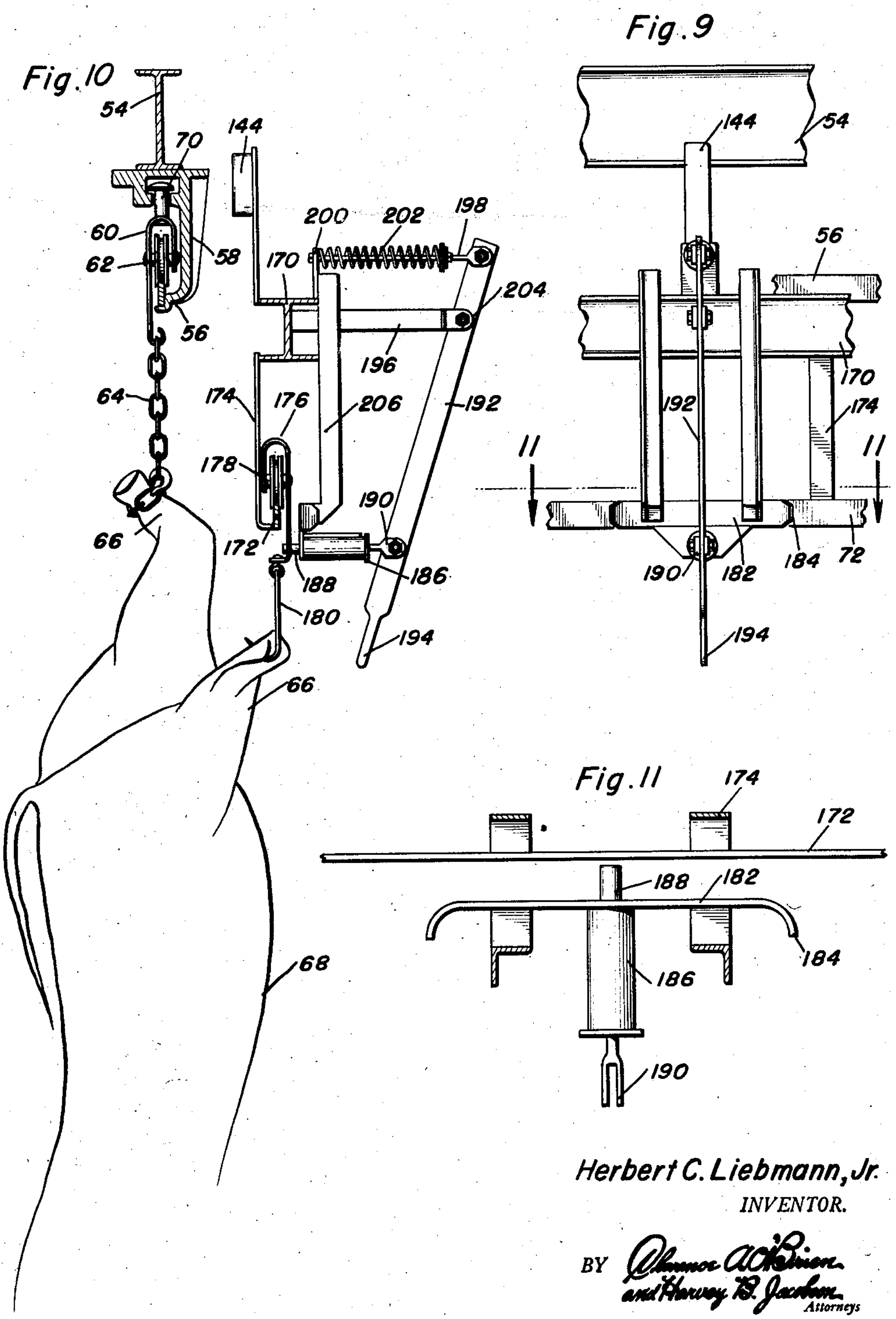
Figure 9 is a detailed, side elevational view showing the construction of the manually operated stop member for limiting and guiding the position of the hook shackles.
Figure 10 is a side elevational view of Figure 9, taken upon a plane at right angles to the plane of Figure 9 showing the details of construction of the limit means and the handle for operation thereof.
Figure 11 is an enlarged top plan sectional view taken substantially along section line 11—11 of Figure 9 showing the guide and projecting lugs for limiting the movement of the successive hook shackles.

Referring now specifically to Figure 5, it will be seen that a rail 170 is positioned below the rail 154 and includes a trackway 172 suspended therefrom by brackets 174. The trackway 172 is generally inclined and receives a plurality of shackles 176 having rollers 178 and hooks 180 for supporting the carcass 68 by penetrating the leg 66. Positioned adjacent and behind the lowering ram 94, it will be seen that a guide 182 having outwardly curved ends 184 is provided in parallel position to the trackway 172. Secured to the rear surface of the guide 182 is a cylinder 186 having a slidable peg 188 projecting therefrom and projecting through the guide 182 to a position closely adjacent and below the trackway 172 for positioning in the path of movement of the shackles 176. The outer end of the peg 188 is bifurcated, as indicated by the numeral 190, and is pivotally secured to an elongated handle 192 adjacent a hand-gripping portion 194. The handle 192 is pivoted to a bracket 196 in spaced relation to the other end thereof, and the remote end of the handle 192 is pivotally secured to a rod 198 slidably attached to a bracket 200 wherein a compression spring 202 is positioned in surrounding relation to the rod 198 wherein the handle 192 will be urged about a pivot 204 connecting the handle 192 to the bracket 196. This will continuously urge the peg 188 into the path of movement of the shackles 176 thereby preventing movement of the shackles 176 downwardly along the inclined trackway 172 until such time as the hand-gripping portion 194 of the handle 192 is grasped and the handle 192 moved outwardly, thereby retracting the peg 188 and permitting one of the shackles 176 to proceed downwardly along the inclined rail 172. As shown in Figure 10, the hook 180 is positioned in the dressed top of the leg 66 and the lowering ram 94 is then lowered wherein the hook 180 supports the entire weight of the carcass 68 while the other leg is being dressed. The handle 192 is actuated for releasing the carcass for movement down the inclined trackway 172 after the chain 64 has been disengaged from the undressed leg 66. It will be seen that the guide 182 is supported by a pair of depending brackets 206 that are attached to the rail 170.

Positioned on the inclined trackway 172 is a feeding device, generally indicated by the numeral 208, wherein the trackway 172 is provided with a pair of spaced apertures 210 as shown in Figure 5. Referring specifically to Figure 12, it will be seen that the feeding device 208 generally includes a plate 212 having an arm 214 pivotally secured thereto. The arm 214 is pivotally supported in spaced relation to its ends and a pair of links 216 and 217 are pivoted to the arm 214 in spaced relation to the pivotal connection between the plate 212 and the arm 214. The links 216 and 217 are each provided with an enlarged portion 218 and reduced end portions 220 and 221 for selectively projecting through the apertures 210 in the rail 172. A connecting lever 222 is pivotally secured to the end of the arm 214 by pivot pin 224 and the other end of the connecting lever 222 is connected to an offset crank 226 rotatable with and secured to the end of a rotating shaft 228. The rotating shaft 228 is mounted in suitable bearing blocks 230 on a mounting plate 232 for rotation about a vertical axis. The shaft 228 is provided with a sprocket gear 234 having a sprocket chain 236 positioned therearound, wherein the sprocket chain passes over a sprocket gear 238 secured to a sprocket 240 for supporting the chain 242 that forms the conveying means for the second conveying system to be described hereinafter. A chain tightening sprocket 244 is mounted on an arm 246 that is spring-urged by a spring 248 wherein the sprocket gear 244 will engage the chain 236, thereby retaining the chain 236 in taut condition. As the conveyor chain 242 is moved, the sprocket 240 is rotated, thereby rotating sprocket gear 238 and sprocket gear 244 through the use of the sprocket chain 236. As the shaft 228 is rotated by the gear 234, the crank 226 will rotate about a vertical axis defined by the shaft 228 and move the connecting lever 222 in the nature of a connecting rod wherein the links 216 and 217 will be reciprocated for alternate projection and retraction in relation to the spaced apertures 210 in the track 172. When the reduced end 220 of the link 216 projects through an aperture 210, the reduced end 220 is in the path of movement of the shackles 176 wherein the shackles are prevented from moving along the trackway 172. In operation, the reduced projecting end 220 remote from the handle 192 is projected through the aperture 210, thereby stopping the shackle 176. As the shaft 228 is rotated, the remote projection 220 is retracted and projection 221 which is nearest the handle 192 is projected through its aligned aperture 210, thereby preventing movement of the next adjacent shackle 176 while the shackle 176 previously engaged by the remote projection 220 is permitted to move down the inclined trackway 172. As long as the shaft 228 is rotating, the shackles 176 together with the carcasses 68 suspended therefrom will be permitted to roll down the inclined trackway 172, one at a time, at a predetermined spaced interval, thereby feeding a conveying system, to be described hereinafter, with the carcasses 68 spaced at predetermined intervals.

Referring now specifically to Figure 19, it will be seen that the chain 242 urges the shackles 176 along the trackway 172. A pair of pivotal lugs 250 and 251 are secured to the undersurface of the chain 242 for urging the shackles 176 with the hooks 180 embedded in the legs 66 and 67 of the carcass 68 along the endless trackway 172 in spaced relation so that the legs 66 and 67 will be positioned in spaced relation. The first shackle is positioned in the leg 67 during the transfer of the carcass 68 at the lowering ram and the second shackle 176 is positioned thereon by the inclined rail 36 wherein the hook 180 is positioned in the other leg 66 after the undressed leg 66 has been dressed. It will be seen that the lugs 250 and 251 are in spaced and timed relation, and also positioned between each pair of pivotal lugs is a projecting lug 252 for a purpose described hereinafter. It will be seen that the forwardmost pivotal lug 250 will only pivot in a forward direction, thereby engaging behind the shackle 176, and the rearmost pivotal projection 251 will pivot rearwardly and engage on the forward surface of the rearmost shackle 176, thereby retaining the shackles 176 in spaced relation for movement on the trackway 172 wherein the carcass is positioned and maintained in spaced and accessible position while the carcass 68 is moved past the station for skinning and removing the front feet, as well as the station for opening the neck and skinning the rosette. Also, the carcass 68 is moved past the brisket skinner's bench 40, which may be of any well known design wherein the bench may be elevated to a desired height for efficient skinning of the brisket by the operator of this particular station. The carcass 68 then moves along the trackway 172 until it passes the tail skinner's position and the brisket saw for opening the brisket, wherein the brisket saw 44 is positioned substantially opposite to the tail puller's station.

Referring now specifically to Figures 14–18, it will be seen that the brisket saw is generally designated by the numeral 44 and includes a bracket 254 extending from the rail 170 in lateral relation wherein the bracket 254 supports a short trackway 256 at its outer end for receiving a shackle 258 having a roller 260 thereon engaging the trackway 256. Pivotally and rotatably journaled in the lower end of the shackle 258 is a pulley housing 262 that is supported by complemental hook and eye members 264. The housing 262 supports a counterbalanced pulley 266 that is provided with a depending supporting cable 268. The suspending cable 268 is connected to a depending rod 270 by complemental hook and eye members 272 and the lower end of the rod 270 terminates in a U-shaped member 274 that is inverted and provided with apertures 276 at the lower end thereof. A rotatable pulley 278 is journaled on a pivot pin 280 on the rod 270 for receiving a flexible line 282 having an enlarged ball 284 on one end thereof for a purpose described hereinafter.

Figures 14, 18:
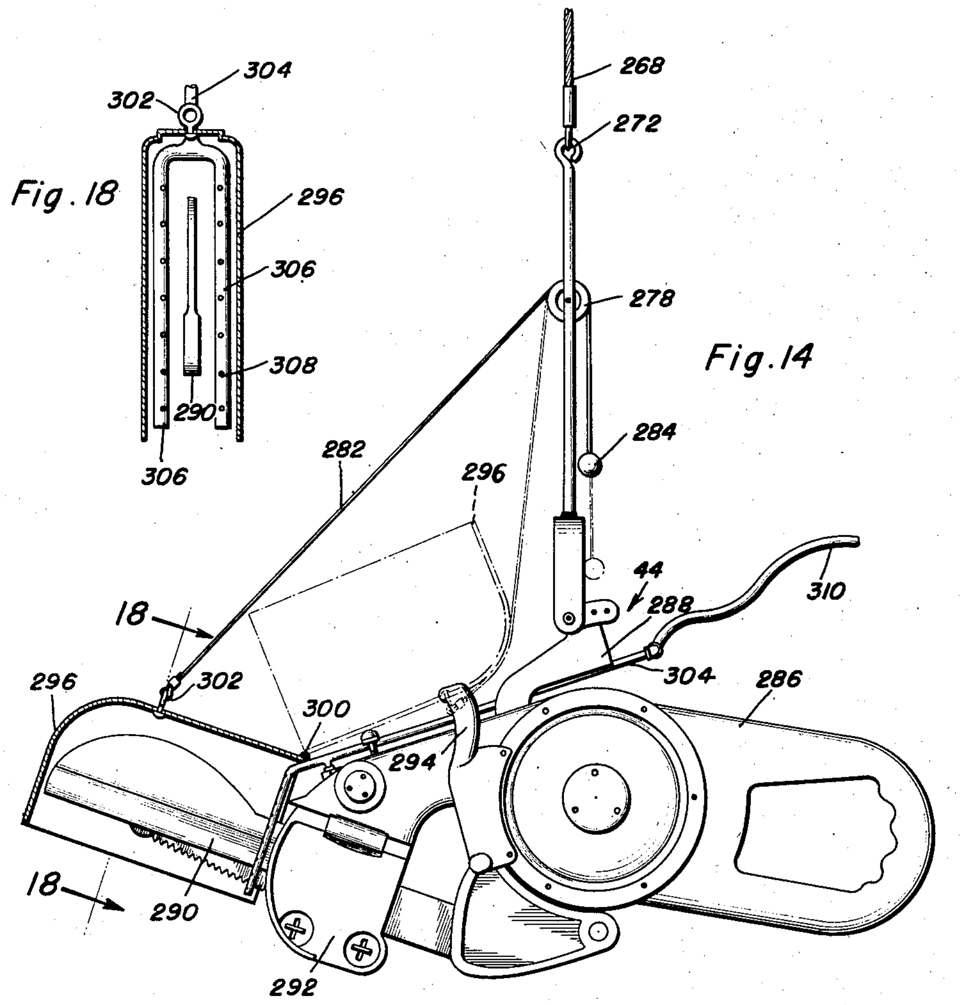
Figure 14 is a side elevational view, with portions thereof in section, showing the details of construction of the brisket saw or breast saw and the guards therefor, together with the sterilizing means for the saw.
Figure 18 is a detailed, sectional view taken substantially upon a plane passing along section line 18—18 of Figure 14 showing the details of construction of the sterilizing means for the brisket saw and guard.

As shown specifically in Figure 14, an electric motor 286 is provided with a bracket 288 pivotally mounted between the legs of the U-shaped member 274 and the electric motor drives a brisket saw 290 through a suitable gearing mechanism 292. Suitable handle means 294 is provided for manipulating the brisket saw 44 wherein the operator may easily operate the brisket saw 44. The counterbalanced pulley 266 will permit the brisket saw 44 to be raised and lowered and retained in any desired condition.

Figure 17:
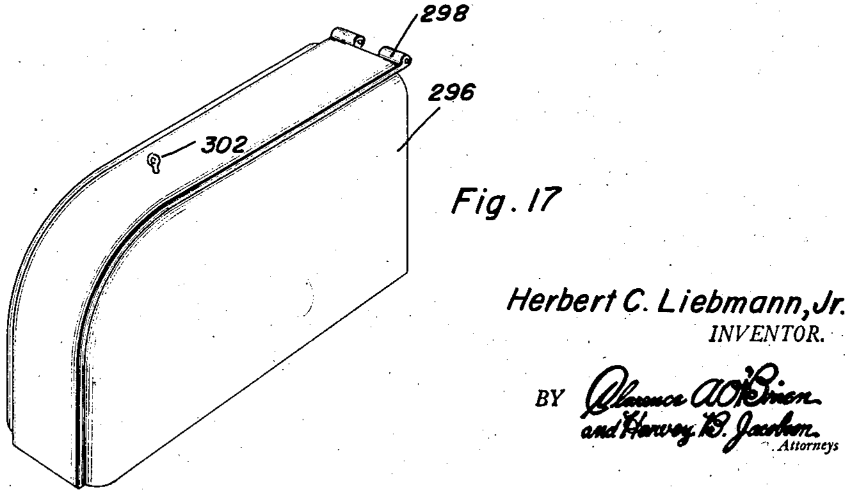
Figure 17 is a perspective view showing the guard for the brisket saw of the present invention.

Referring now specifically to Figure 17, it will be seen that a generally right angular casing or housing 296 is provided with hinge barrels 298 on one end thereof for hingedly attaching the housing 296 to the frame of the brisket saw 44 by hinge means 300. It will be seen that the housing 296 covers the brisket saw 290 for a purpose described hereinafter. An eye member 302 is provided in the upper outer end of the housing 296 for attachment to the end of the flexible line 282 wherein the housing 296 may be pivoted from a position covering the saw 290 to a position wherein the saw may be utilized in opening a brisket substantially as shown in phantom in Figure 14. Secured to the frame of the brisket saw 44 is a conduit 304 terminating in a pair of pipes 306 having a plurality of apertures 308 in longitudinally spaced and aligned position along the length thereof. It will be seen that the elongated pipes 306 form substantially a U-shaped member in communication with the conduit 304 that is connected to a pressurized steam line 310. When the pressurized steam is admitted to the conduit 304 and into the pipes 306, the steam and water, or hot water, will be discharged from the openings 308 onto and about the brisket saw 290, wherein the brisket saw 290 will be sterilized between each cutting operation.

Figures 8, 15, 16:
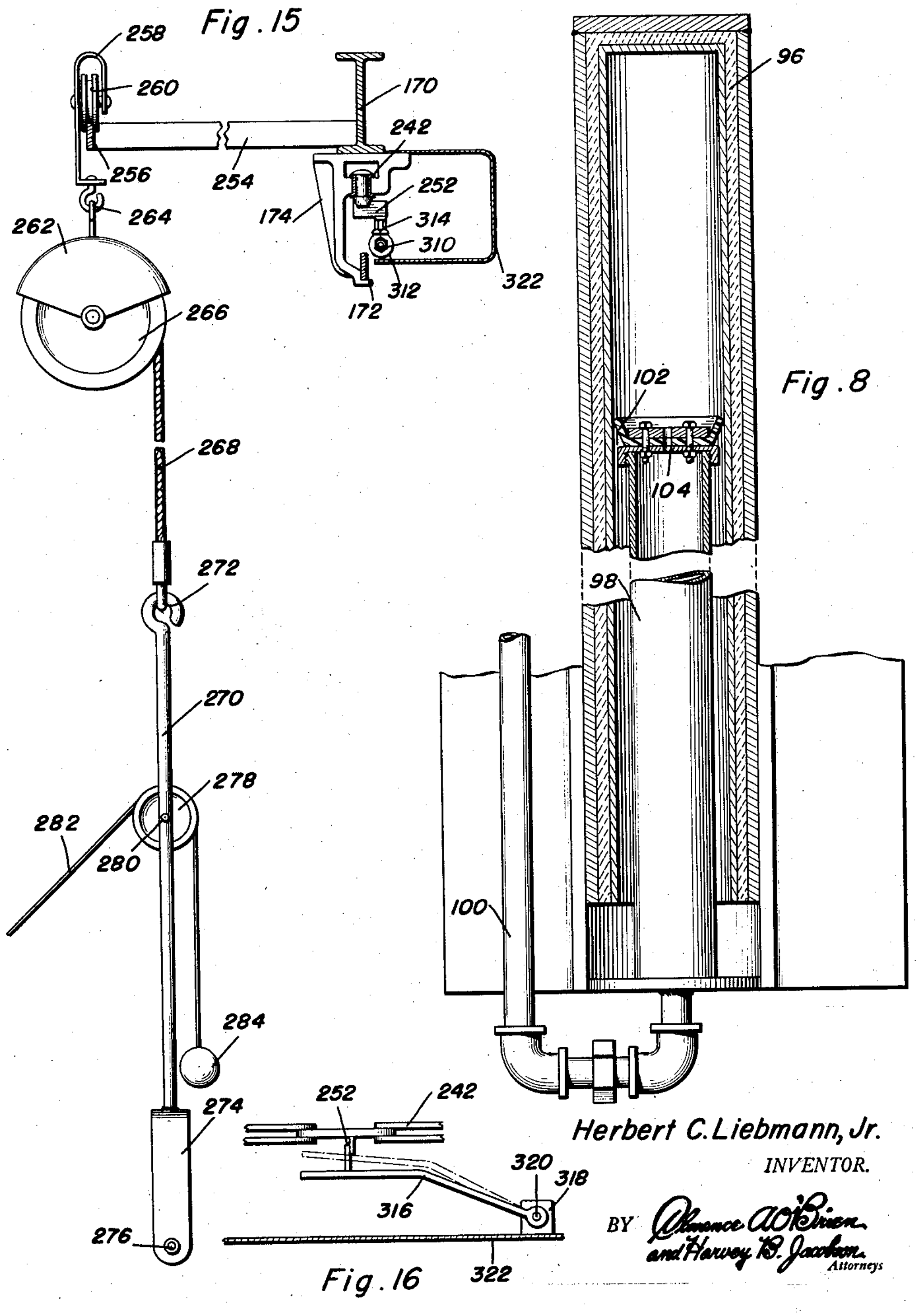
Figure 8 is a longitudinal, vertical sectional view taken substantially upon a plane passing along the longitudinal center line of the lowering ram showing the details of construction of the hydraulic piston and cylinder arrangement for raising and lowering the ram.
Figure 15 is a detailed side elevational view showing the raising and lowering means for the brisket saw, together with the means for raising and lowering the guard therefor.
Figure 16 is a top plan sectional view showing the lugs on the conveying chain for engaging a pivotal stop member.

Referring now specifically to Figure 15, it will be seen that the conduit 310 is connected to a valve 312 having a plunger valve stem 314 thereon wherein the plunger 314 is spring urged to an open position and an actuating arm 316 is pivoted to a bracket 318 by pivot pin 320 wherein the bracket 318 is secured to a supporting structure 322. The lug 252 on the chain 242 engages the actuating arm 316 and, due to the cam shape of the actuating arm 316, the arm 316 will be urged towards and into engagement with the valve plunger 314, for depressing the same, thereby closing the valve 312 and terminating the flow of steam or hot water in the conduits 310 and 304. It will be seen that each time a carcass 68 is positioned in front of the brisket saw, generally indicated by the numeral 44, the projection 252 on the conveying chain 242 will engage the actuating arm 316, thereby closing the valve 312 and stopping the flow of sterilizing fluid in the conduits 310 and 304 and in the pipes 306. Due to the elongated nature of the actuating arm 316, the valve 312 will remain closed during the brisket opening operation and during movement of the conveying chain 242, thereby assuring that the sterilizing fluid supply will be closed during the actual brisket-opening operation. As soon as the chain 242 carries the projection 252 out of engagement with the actuating arm 316, the valve 312 is opened, thereby admitting sterilizing fluid to the pipes 306, and thereby sterilizing the saw 290 that is encased in the housing 296. It will be seen that the housing 296 confines the area to be sterilized and prevents burn injuries to the operator of the brisket saw. It will be seen that upon each brisket-opening operation, the casing 296 is pivoted to an inoperative position as shown in Figure 14 and the flow of sterilizing fluid is automatically cut off by the projection 252 on the chain 242. It will be seen that the chain 242 continues to carry the carcass 68 past the brisket saw station wherein the sterilizing procedure of the brisket saw will begin automatically as soon as the carcass 68 has passed the brisket saw station. This eliminates any possible contacts between the heated sterilizing fluid and the animal that is being dressed while the sterilizing fluid retains the brisket saw in a sterile and sanitary condition. The particular sterilizing fluid may be either steam, hot water, or a combination of both as desired, and it will be seen that the casing 296 not only provides a guide for the sterilizing fluid but also prevents escape of the fluid therefrom except in a downward direction and consequently prevents burn injuries due to the operator of the brisket saw station coming into contact with the sterilizing fluid.

After the carcass 68 has passed the brisket saw station, it proceeds on the trackway 72 under the impetus of the lugs 250 and 251 on the chain 242 to the hide pulling station having the hide puller 46 and an operator's platform 48, as illustrated in Figure 1.

Referring now specifically to Figures 20–24, it will be seen that the hide puller 46 includes generally a vertical upright frame 324 having spaced vertical members wherein a pair of rollers 326 are positioned on the lower end thereof and rotate about a vertical axis between members 328 wherein the bottom end of the vertical members 324 are guided in horizontal sliding movement. The upper ends of the vertical members 324 are provided with outwardly inclined rollers 330 for engaging the lower flange of a supporting I-beam 332 that may be inclined downwardly towards the flow of the carcasses that enter into the hide pulling station, for a purpose described hereinafter. A pressure tank 334 is positioned on a suitable bracket 336 rearwardly of the members 324 for movement therewith. Further, it will be understood that the entire hide puller 46 moves along the supporting rail 332 and is guided by the lowermost rollers 326. Secured to bracket means 338 and disposed between and forwardly of the vertical members 324 are a pair of remotely positioned pulling piston and cylinder arrangements 340 having grippers 342 on the outer ends thereof. Positioned between a stationary central member and the pulling hydraulic cylinder arrangement 340 is a radial hydraulic piston and cylinder 344 wherein the radial piston and cylinder 344 adjusts the angular position of the pulling cylinders 340. A central pusher element 346 in the form of a hydraulic piston and cylinder arrangement 348 is provided with a generally concave member 350 on the outer end thereof for engaging the back portion of a carcass for a purpose described hereinafter. A set of hydraulic pushing elements 352 are positioned on each side of the central member 346 and are provided with end portions 354 for engaging the carcass in a manner to be described. Further, it will be seen that each of the hydraulic cylinder arrangements is provided with a supply line 356 for controlling the operation thereof.

Figure 21:
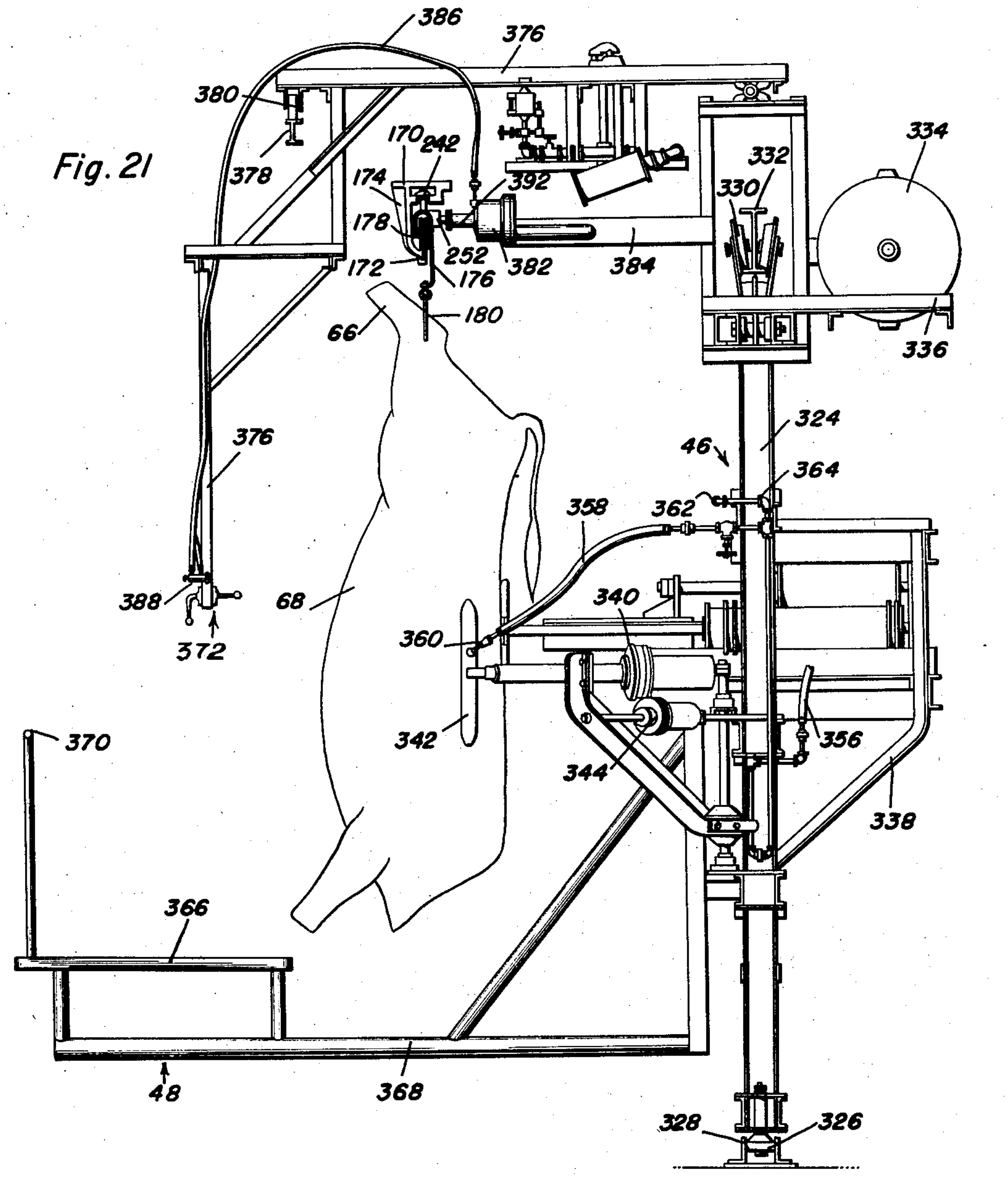
Figure 21 is an end elevational view taken substantially at right angles to the plane of Figure 20 showing further structural details of the hide pulling mechanism, together with the operator's platform, and the controls for manipulating the hide puller and for positioning the carcass centrally of the hide puller.
Figures 22, 23, 24:
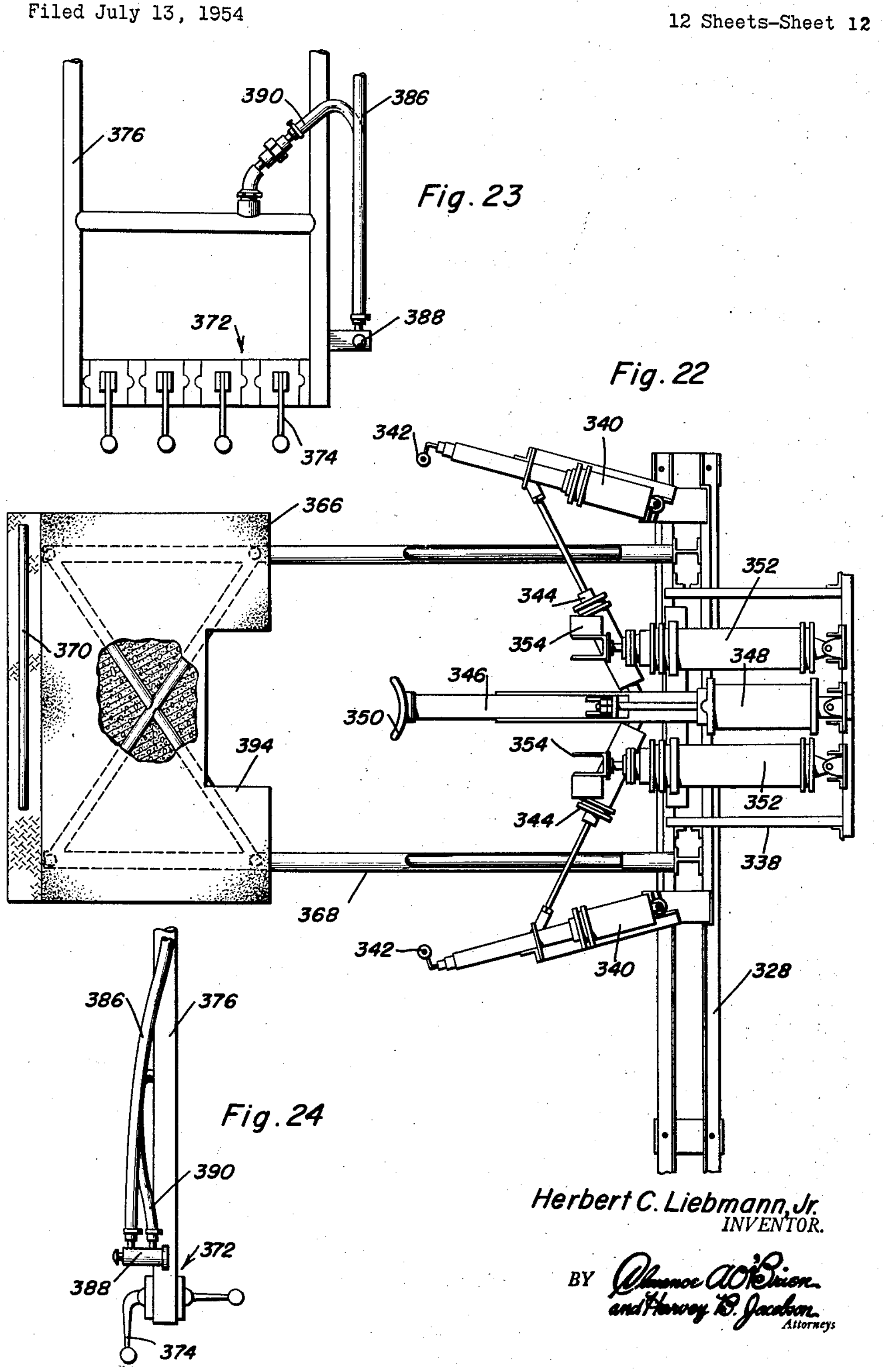
Figure 22 is a top plan view of the hide puller of the present invention with portions omitted for clarity, together with a portion of the platform being in section showing the details of construction thereof.
Figure 23 is an enlarged view of the control mechanism for the hide puller and the carcass positioning means.
Figure 24 is a side elevational view of the construction of Figure 23, showing further structural details of the control mechanism for operation of the hide puller by the operator standing on the operator's platform.

As specifically shown in Figure 21, each of the gripping elements 342 is provided with a flexible conduit 358 that is connected to a suitable fitting 360 thereon and connected by valve means 362 to a sterilizing fluid line 364. The operator's platform 366 is positioned on a bracket 368 that is secured to the hide puller 46, and the platform 366 is provided with a suitable guard 370 for supporting the operator of the hide puller 46 in position wherein access may be had to the control means generally indicated by the numeral 372 for manipulating the various hydraulic cylinders and pistons of the hide pulling machine 46 wherein the hide is removed from the carcass 68. The control panel 372 is provided with a plurality of control handles 374 that directly control the hydraulic cylinder and piston arrangement through suitable flexible conduits (not shown). It will be seen in Figure 21 that the control panel 372 is supported from an overhead bracket 376 that has its outer end supported on a rail 378 by a roller 380 wherein the bracket 376 and control panel 372 may move with the hide pulling machine 46.

A cylinder 382 secured to a bracket 384 positioned below the bracket 376 is provided with a control line 386 that is connected to a push button valve 388 that is in communication with a conduit 390 for supplying air pressure to the cylinder 382. A piston rod 392 extends from the cylinder 382 and engages the lug 252 on the chain 242, thereby moving the entire hide pulling machine during the hide stripping operation due to the engagement of the projecting end of the piston 392 that is retracted and extended by the cylinder 382. The hide puller 46 normally moves to the end of the downwardly inclined rail 332 that is nearest to the brisket saw station and the projecting cylinder 392 is extended into the path of movement of the lug 252 on the continuous conveying chain 242. As the lug 252 moves along, it engages the projecting piston 392, thereby aligning the shackle 176 and the carcass 68 in exact centered relation to the hide pulling machine 46, thereby permitting the operator standing on the operator's platform 366 to engage the grippers 342 with the hide and manipulate the control panel 372 in a most efficient manner for removing the hide. As the chain 242 continues to move, the projecting piston 392 will cause the entire hide pulling machine 46 to move along supporting rail 332 as guided by the rollers 326 and rail 328 at the bottom thereof so that the hide pulling operation is carried out during the continuous movement of the carcass 68, thereby retaining the carcass 68 and the hide pulling machine 46 in correct relative position. After the hide has been pulled from the carcass 68, the operator engages the push button valve 388, thereby retracting the piston projection 392 for permitting the carcass 68 and the chain 242 to continue in its movement and also allowing the hide pulling machine 46 to proceed downwardly along the inclined rail 332 towards the bricket saw station, thereby positioning the hide puller 46 for a repeat operation.

Sterilizing water is supplied to the grippers 342 while the pulling piston and cylinder arrangements 340 are at the extended position and while the grippers are being secured to the hide. In pulling hide from the carcass 68, the hydraulic piston and cylinders 344 are extended and arrangements 340 are extended while the grippers 342 are attached to the hide. The pulling arrangements 340 are then retracted and the radial piston and cylinders 344 are also retracted, thereby partially pulling the hide away from the carcass. The central pusher cylinder 348 is then extended, thereby pushing the carcass away from the grippers 342, and the members 344 cause the pushers 354 to engage the carcass and to help peel the hide completely from the flanks or rear meat portion of the carcass. The pushing cylinders are then retracted and the grippers released, wherein the cycle is then complete. The sterilizing water is shut off during a portion of the time that the grippers are not in use in order to conserve water and also to keep water off the hide and carcass and to prevent splashing and burning of nearby workmen by the sterilizing water which is heated to a relatively high degree. It also will be seen that the platform 366 is provided with a recessed central area 394 for permitting drainage of the sterilizing water and also fluids from the carcass into a drainage pit positioned under the platform. Obviously, the platform and the various gripping and pushing and pulling elements may be adjustably positioned for correct positioning of the platform 366 in relation to the hide pulling machine 46.

After the carcass 68 passes the hide puller 46, it passes the backer stand and backer bench wherein final dressing is carried out and the carcass is then ready for storage or further processing as may be desired. However, this invention is not concerned with the storage or the final disposition of the carcass after it has been completely cleaned and dressed.

Figure 20:
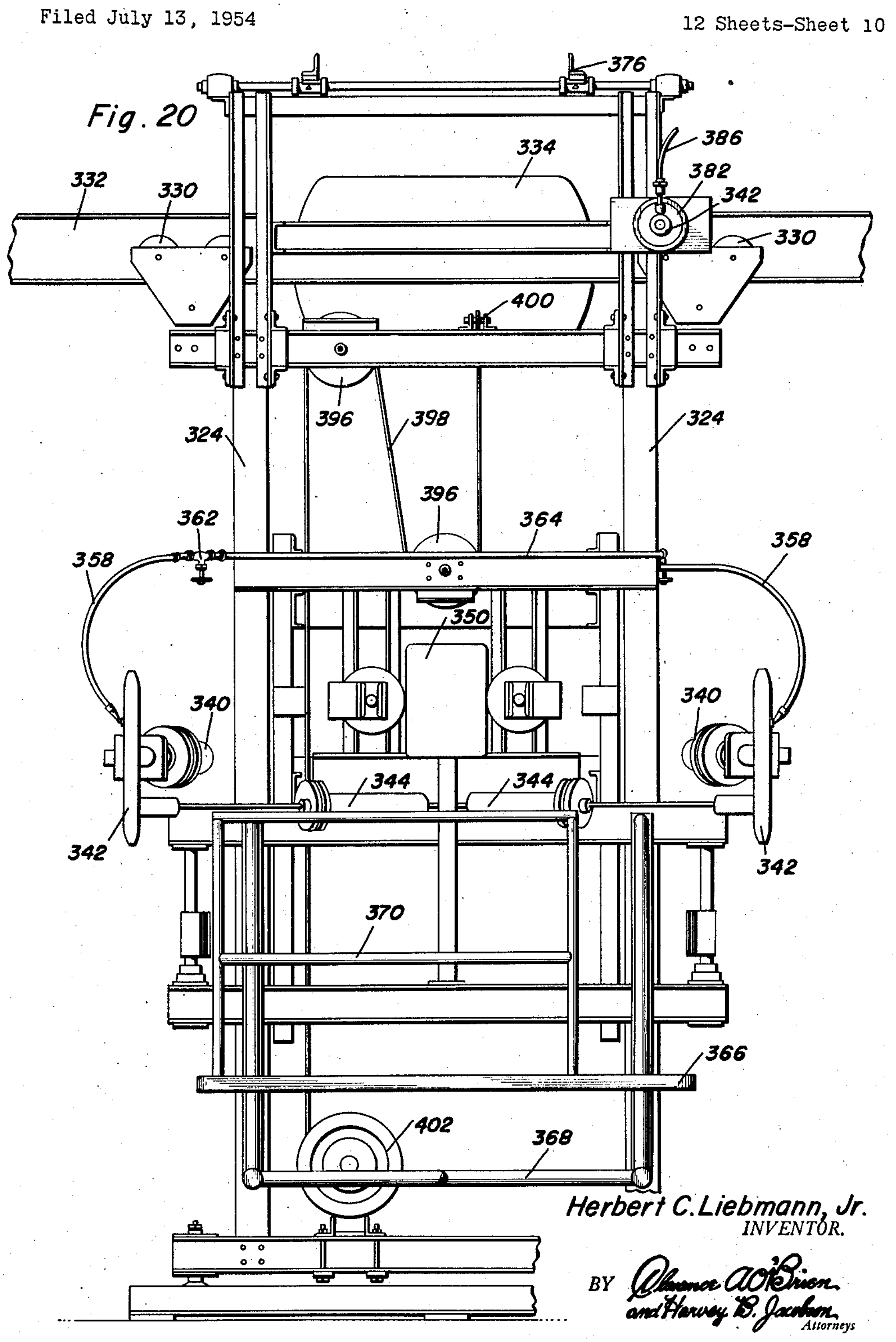
Figure 20 is a side elevational view showing the construction of the hide puller of the present invention.

As shown in Figure 20, a series of pulleys 396 are provided with a cable 398 passing thereover, and the cable 398 is secured at one end to a frame member by bracket means 400. The other end of the cable 398 is positioned around a winch 402 driven by a suitable electric motor (not shown) that is mounted on the bottom frame member that interconnects the vertical members 324 for raising and lowering the hide pulling machine.

In operation, the animals to be slaughtered are first led into a knocking pen where they are either stunned or killed as desired. They are then hoisted by any suitable means and the chain 64 on the shackle 60 is secured to one hind leg and the roller 62 is positioned on an inclined trackway 14 which leads to a trolley or trackway feeding device 18 wherein one of the shackles 60 is discharged onto the continuous trackway 56 for engagement by a projection on the endless chain 70. The endless chain 70 passes over the timing sprocket 72 wherein the timing sprocket, through the use of the two sets of cams 82 and 84 together with the switches 88 and 89 will operate the pump 126 and the solenoid 140 for actuating the valve 138, thereby automatically lowering and raising the lowering ram 94 at predetermined intervals wherein the timing sprocket 72 coordinates the movement of the shackles 60 along the trackway 56.

When a shackle 60 engages the portion 124 of the trackway 56 and is seated in the depressed or concaved seat therein, the lowering ram 94 is automatically lowered after a hook 180 has been engaged with the other leg 67 of the carcass 68 that has been dressed and the shackle 176 is positioned over the trackway 172 that is inclined, wherein the carcass will move under the force of gravity after the lowering ram 94 has been lowered and the chain 64 released from the undressed leg 66 of the carcass 68. The shackle 176 engaging the dressed leg 67 proceeds by gravity down along the trackway 172 and is guided by the guide 182 against the projection 188 which is operated manually by the handle 194. When the handle 194 is withdrawn, the projection 188 is withdrawn from the path of movement of the shackle 176, thereby permitting the carcass 68 to proceed down the inclined trackway 172 by gravity without the use of any conveying chain.

In order to prevent any accidental alignment of a shackle 60 with the open portion of the trackway 56, a safety switch 142 is provided in the path of movement of the shackle 60 wherein the safety switch 142 will immediately stop the conveying chain 70 and the shackle 60, if the shackle 60 proceeds towards the open portion of the trackway 56 when the portion 124 of the trackway 56 has not been fully raised. An actuating arm 154 is positioned in the path of movement on the shackle 60 wherein the shackle 60 will engage the arm 154 and actuate the switch 144 through linkage 148 and 146 if the plate 124 is not in its fully raised position. However, if the plate 124 is in its fully raised position, the extending arm 168 secured thereto raises the link 148 upwardly, thereby disengaging the links from the actuating arm 154 wherein the switch 144 will not be actuated if the plate 124 is in its uppermost position.

After the shackles 176 proceed down the inclined rail 172, a feeding device, generally indicated by the numeral 208, feeds the shackles 176 onto the continuous trackway 172 under the continuous chain 242 that encircles the members 240. The chain 242 is provided with pivot lugs for engaging the upper ends of the shackles 176 for movement thereof and the feeding device 208 permits the shackles 176 to proceed onto the endless trackway 172 in the same spaced relation as the pivotal projections 250 and 251. It will be seen that the feeding device 208 is driven from a sprocket gear 238 mounted on the chain sprocket 240 and connecting rods and levers are provided for transmitting the rotary motion to reciprocating motion wherein projections 220 and 221 that are in spaced relation alternately engage and release successive shackles 176. The reciprocation of the projections through the apertures 210 in the trackway 172 is so timed that the shackles 176 will be released from engagement by successive pairs of projections 250 and 251 wherein the shackles 176 are urged around the trackway 172 in spaced relation thereby retaining the shackles 176 in relation so that the forward of each pair of lugs 250 and 251 engages the forward shackle that now carries the single dressed leg 67 of the carcass. As the carcass 68 proceeds along the trackway 172, the other leg 66 is dressed and another hook shackle 176 is secured thereto and fed onto the rail 172 by an inclined feed rail 36. The rearmost of the shackles 176 is engaged by the rearmost of each pair of projections 250 and 251, thereby retaining the shackles in correct position.

The carcasses 68 then proceed around the trackway 172 past the front feet skinning and removing station, brisket skinning and removing station, neck opening and rosette skinning station, all of which are not involved with the specific details in this invention, although they form a vital part of the over-all slaughtering process. The brisket saw station is provided with the usual brisket saw 44 having the reciprocating saw element 290 driven by a suitable electric motor 286 having handles 294 thereon for manipulation of the same. A counterbalance support pulley 266 is provided for raising and lowering and retaining the brisket saw 44 in adjusted position. A casing or housing 296 is provided over the reciprocating saw element 290 and a flexible line 282 is connected thereto and provided with a handle 284 wherein the casing or housing 296 may be pivoted to an out-of-the-way position substantially as illustrated in phantom in Figure 14. Sterilizing pipes 306 are positioned at the rear portion of the casing 296 and sterilizing water is discharged through the openings 308 onto the reciprocating saw element 290, thereby sterilizing the saw element 290. The casing 296 prevents spraying of the hot sterilizing water onto the carcass and onto adjacent workmen, thereby preventing damage to the carcass being dressed and also preventing burns that may be caused by the sterilizing water which is heated to a high degree. As shown specifically in Figure 16, a projection 252 on the continuous chain 242 engages an actuating arm that rides against the plunger valve stem 314 of a valve 312, thereby shutting off the sterilizing water during actual movement of the carcass past substantially the entire brisket sawing operation, thereby preventing flow of the sterilizing water during the actual time that the brisket saw is being utilized and thus insuring that the hot sterilizing water will not come into contact with the carcass being dressed. Immediately upon passing of the carcass beyond the brisket saw, the projection 252 is disengaged from the actuating arm 316 and, due to the spring-loaded condition of the plunger 314, the valve 312 will be opened, thereby permitting the sterilizing water to be discharged through the opening 308 onto the reciprocating saw element 290. The casing 296 may be pivoted downwardly into enclosing relation to the reciprocating saw element 290, thereby preventing spraying of the sterilizing water to adjacent areas onto the cattle being dressed or onto nearby workmen.

After the carcass leaves the brisket saw station, it is positioned in centered relation to the hide pulling machine 46. The hide pulling machine 46 is supported on overhead rail 332 and guided by the lower members 328 and the rollers 326 for horizontal movement during the hide pulling operation. The rail 332 is inclined downwardly towards the brisket sawing station wherein the force of gravity will normally position the hide pulling machine 46 adjacent the brisket sawing station. A cylinder 382 is provided with a projecting piston 392 that projects into the path of movement of the projection 252 on the continuous conveying chain 242 wherein the projection 252 will engage the piston 392 during the movement of the chain 242. When the piston 392 is in engagement with the projection 252, the carcass 68 is centrally positioned in relation to the hide pulling machine 46. Also, the piston 392 remains in contact with the projection 252, thereby moving the entire hide pulling machine 46 along the overhead rail 332 as guided by the rollers 326 wherein the hide pulling machine 46 and the carcass 68 are moved along at the same speed with the carcass in centered relation. The hide pulling machine 46 is adjusted vertically by manipulating the winch 402 in an obvious manner. Further, the operator positioned on the platform 366 moves along with the hide pulling machine 46 and is provided with a control valve 388 for retracting the piston 392, thereby releasing the hide pulling machine 46 from the chain 242 when the hide pulling operation is complete, thereby permitting the hide pulling machine 46 to return by gravity towards the brisket sawing station due to the inclined relation of the rail 332. The hide pulling machine 46 is provided with a plurality of hydraulically extensible and contractible cylinder and piston arrangements for gripping and pulling the hide from the carcass 68 together with a back engaging member for pushing the back, thereby completely peeling the hide from the carcass 68. The grippers 342 for gripping the hide are provided with sterilizing openings for receiving sterilizing water from a conduit 358 wherein the grippers that actually engage the hide and engage the dressed carcass 68 are retained in a sanitary and sterilized condition at all times, thereby assuring that the rigid sanitation requirements of a slaughter house will be met.

It will be understood that the process and apparatus for slaughtering animals of the present invention provides a more efficient, more sanitary, and more easily performed operation wherein animals may be slaughtered with a less amount of time for each unit and with less skilled personnel or employees carrying out the various operations, thereby decreasing the slaughtering costs a great deal. Further, it will be noted that the operation of the device is substantially fully automatic as to the transferring of the carcasses from one conveying rail or overhead trolley to the other conveying rail, trackway, or overhead trolley. It will be seen that the particular construction of the device permits easy adaptation for various installations having various requirements of space and arrangement. While the device as illustrated shows the invention utilized in connection with beef cattle, it will be understood that any type of animal normally slaughtered for eating purposes may be slaughtered with the process and apparatus of this invention and the various sterilizing features will retain the slaughter house within the rigid sanitary requirements of the various departments that enforce the usual sanitation regulations.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An apparatus for transferring an animal suspended from a shackle on a continuous first overhead trackway having an open section to a shackle on a second overhead trackway at a lower elevation comprising a vertically movable trackway segment for positioning in the open section of the first trackway, means on said segment for receiving the shackle and removably holding the shackle thereon, conveying means adjacent the first trackway engaging the shackle for moving the shackle from the first trackway onto the segment, a supported fluid pressure operated means supporting said segment and actuated by the conveying means for vertical movement from a position in the open section of the first trackway to a position adjacent the second trackway with the shackle on the second trackway being connected to the animal during the lowering operation of the segment for transferring the animal to the shackle on the second trackway and permitting release of the animal from the shackle on said segment for return of the shackle on the segment to the first trackway when the segment is raised into the open section thereof.

2. An apparatus for transferring an animal suspended from a shackle on a continuous first overhead trackway having an open section to a shackle on a second overhead trackway at a lower elevation comprising a vertically movable trackway segment for alignment with the first trackway and positioning in the open section thereof, means on said segment for receiving the shackle and removably holding the shackle thereon, conveying means adjacent the first trackway engaging the shackle for moving the shackle from the first trackway onto the segment, a supported fluid pressure operated means supporting said segment and actuated by the conveying means for vertical movement from a position in the open section of the first trackway to a position adjacent the second trackway with the shackle on the second trackway being connected to the animal during the lowering operation of the segment for transferring the animal to the shackle on the second trackway and permitting release of the animal from the shackle on said segment for return of the shackle on the segment to the first trackway when the segment is raised into the open section thereof, means mounted on said first trackway for preventing movement of the shackle into the open section of the trackway until the segment is in elevated position in alignment with the first trackway, means mounted on the second trackway and actuated by the conveying means for releasing the shackle on the second trackway in timed spaced relation to an adjacent shackle, and means supported adjacent the second trackway and engaged with the shackles thereon for moving the shackles on the second trackway in spaced relation.

References Cited in the file of this patent

UNITED STATES PATENTS

| | | |
|---|---|---|
| 243,809 | Sparrow | July 5, 1881 |
| 1,434,440 | Knudsen | Nov. 7, 1922 |
| 2,159,623 | Schmidt | May 23, 1939 |
| 2,551,155 | Orling | May 1, 1951 |
| 2,596,481 | Hincks | May 13, 1952 |
| 2,640,225 | Force et al. | June 2, 1953 |
| 2,696,633 | Hincks | Dec. 14, 1954 |